US012741254B2

(12) United States Patent
Dreiling

(10) Patent No.: US 12,741,254 B2
(45) Date of Patent: Sep. 22, 2026

(54) ASYMMETRICAL MAGNETIC STIR BAR

(71) Applicant: HACH COMPANY, Loveland, CO (US)

(72) Inventor: Brian Dreiling, Windsor, CO (US)

(73) Assignee: HACH COMPANY, Loveland, CO (US)

( * ) Notice: Subject to any disclaimer, the term of this patent is extended or adjusted under 35 U.S.C. 154(b) by 592 days.

(21) Appl. No.: 18/199,609

(22) Filed: May 19, 2023

(65) Prior Publication Data

US 2024/0382916 A1 Nov. 21, 2024

(51) Int. Cl.
*B01F 33/452* (2022.01)

(52) U.S. Cl.
CPC .................................. *B01F 33/452* (2022.01)

(58) Field of Classification Search
CPC ................ B01F 33/452; B01F 33/4535; B01F 33/4534; B01F 33/4531; B01F 33/4532; B01F 35/513; B01F 35/5312; B01F 35/60; B01F 2035/352; B01F 2101/22; B01F 2101/44
USPC .................................................. 366/273–274
See application file for complete search history.

(56) References Cited

U.S. PATENT DOCUMENTS 3,088,716 A * 5/1963 Stott ....................... B01F 33/45 310/104
3,514,214 A * 5/1970 Vogtle ................... B01F 33/452 366/273
4,162,855 A 7/1979 Bender
4,665,736 A * 5/1987 Yokoyama ............ B01F 33/453 366/273
6,464,387 B1 * 10/2002 Stogsdill ............... B01F 33/452 366/273
6,988,825 B2 1/2006 Coville et al.
7,520,657 B2 4/2009 Andrews et al.
9,815,035 B2 * 11/2017 Werth ................... B01F 35/513
10,220,361 B1 * 3/2019 Dushine .................. B01F 21/10
10,350,561 B1 * 7/2019 Dushine ................ B01F 33/452

(Continued)

FOREIGN PATENT DOCUMENTS

CN 215939793 U 3/2022
DE 2458904 A1 * 6/1975

(Continued)

OTHER PUBLICATIONS

Jul. 18, 2024 International Search Report and Written Opinion issued in International Application PCT/US24/21677.

(Continued)

*Primary Examiner* — Charles Cooley
(74) *Attorney, Agent, or Firm* — Oliff PLC

(57) ABSTRACT

A magnetic stir bar is described that includes a first portion with an outer perimeter that has a shape in plan view and a center point being a geometric center of the shape. The magnetic stir bar includes a second portion with a magnet that is connected to the first portion. The second portion is arranged so that at least part of the second portion is positioned within the outer perimeter of the first portion and so that a magnetic center point of the magnet in plan view is positioned off-center with respect to the center point of the outer perimeter. A method of mixing a fluid includes providing the fluid in a mixing container with the magnetic stir bar and rotating the magnetic stir bar with a magnetic stirrer.

18 Claims, 4 Drawing Sheets

(56) References Cited

U.S. PATENT DOCUMENTS

| | | | | |
|---|---|---|---|---|
| 10,695,730 | B2 | 6/2020 | Mou | |
| 12,582,949 | B2 * | 3/2026 | Chiang | B01F 33/452 |
| 2014/0340982 | A1 * | 11/2014 | Keel, III | B01F 21/10 366/273 |
| 2017/0007972 | A1 | 1/2017 | Tien et al. | |
| 2022/0241736 | A1 * | 8/2022 | Goshima | B01F 27/93 |
| 2024/0382916 | A1 * | 11/2024 | Dreiling | B01F 33/452 |

FOREIGN PATENT DOCUMENTS

| | | | | |
|---|---|---|---|---|
| GB | 921719 | A | 3/1963 | |
| WO | WO-2016075031 | A1 * | 5/2016 | B01F 33/452 |
| WO | 2020/067891 | A1 | 4/2020 | |

OTHER PUBLICATIONS

Feb. 21, 2023 Patentability Search Report issued in New U.S. Patent Application for "A Non-symmetrical Magnetic Stir Bar".

https://www.ubuy.co.in/product/4LBKVC72E-sp-bel-art-spinring-teflon-magnetic-stirring-bar-38-1-x-8mm-44-5mm-ring-b-d-white-f37140-0015?; Feb. 21, 2023.

https://www.walmart.com/ip/Uxcell-15mm-0-59-Cross-Shape-PTFE-Magnetic-Stirrer-Mixer-Stir-Bar-White-2-Pack/255980412?wmlspartner-wlpa&selectedSellerld=571; May 16, 2023.

https://www.grainger.com/product/LAB-SAFETY-SUPPLY-Stirring-Bar-Alnico-V-Magnet-21R566; May 16, 2023.

https://www.grainger.com/product/6XNZ8; May 16, 2023.

https://www.grainger.com/product/6XPC8; May 16, 2023.

https://www.zoro.com/sp-scienceware-spinstar-stirring-bar-ptfe-2-716-f37146-0250/i/G4718917; May 16, 2023.

https://www.fishersci.se/shop/products/nalgene-suspended-magnetic-stir-bars-1000ml-beaker/10008380; May 16, 2023.

https://www.coleparmer.com/i/scienceware-f371340000-spinvane-stirring-bar-ptfe-triangular-1-ml/0477532?searchterm=UX-04775-32; May 16, 2023.

https://www.coleparmer.com/p/pvdf-magnetic-gamma-stable-stir-bars/68426; May 16, 2023.

* cited by examiner

ASYMMETRICAL MAGNETIC STIR BAR

BACKGROUND

Magnetic stir bars are typically placed in a mixing container with a fluid and rotated by a magnetic stirrer to stir or mix the fluid. Predictable and symmetrical flow patterns formed by currently available magnetic stir bars can result in non-uniform mixing of the fluid in the container, where the fluid has partially mixed or unmixed regions. Air bubbles in the fluid can also collect and stick to the magnetic stir bar and the mixing container. These air bubbles often interfere with measurements or instrument readings, and rotating the currently available magnetic stir bars does not adequately displace these air bubbles. In addition, the magnetic stir bars can get stuck or lodged at an edge of a mixing container or in a corner of a non-round mixing container where a strength of the attraction between the magnet in the magnetic stir bar and the stirrer is too weak to displace the stuck or lodged magnetic stir bar.

Most existing magnetic stir bars are designed for larger, open circular containers such as beakers and flasks. The issues described above are more pronounced when operating a magnetic stir bar in a relatively smaller mixing container or in a mixing container that is closed to the atmosphere. For example, in a small mixing container, a dead spot of unmixed fluid or partially mixed fluid often develops in a middle of the mixing container. Air bubbles sticking to the magnetic stir bar or the mixing container may also take up a larger percentage of volume of the mixing container which can lead to larger errors in measurements or instrument readings. In some application to reduce the presence of bubbles, surfactants have been added to the mixing fluid, but this is not a convenient solution in many applications.

SUMMARY

In one aspect, this disclosure provides a magnetic stir bar that reduces or eliminates these drawbacks.

In another aspect, this disclosure provides a magnetic stir bar comprising a first portion that defines an outer perimeter that has a shape in plan view with a center point being a geometric center of the shape, and a second portion that is connected to the first portion and includes a magnet, wherein the second portion is arranged so that (i) at least part of the second portion is positioned within the outer perimeter of the first portion and (ii) a magnetic center point of the magnet in plan view is positioned off-center with respect to the center point of the outer perimeter.

In another aspect, this disclosure provides a method of mixing a fluid in a mixing container with the magnetic stir bar and rotating the magnetic stir bar with a magnetic stirrer.

DETAILED DESCRIPTION OF EMBODIMENTS

In the following description, numerous details are set forth to provide an understanding of the present disclosure. However, it may be understood by those skilled in the art that the devices and methods of the present disclosure may be practiced without these details and that numerous variations or modifications from the described embodiments may be possible.

The present disclosure provides an asymmetrical magnetic stir bar. As used herein the term "stir bar" does not necessarily require a "bar" shape, as is evident from the description below. The terminology "stir bar" is used herein since it is a widely used term in the art to describe a stirring or mixing mechanism.

In connection with this disclosure, it has been discovered that an asymmetrical stir bar does not suffer the same disadvantages of currently available magnetic stir bars. The asymmetrical stir bar generates an asymmetrical, uneven flow pattern in a mixing container, resulting in less partially mixed or unmixed regions. Less air bubbles collect and stick to the magnetic stir bar and to the mixing container. A shape and a size of the magnetic stir bar prevent the asymmetrical magnetic stir bar from getting stuck or lodged at an edge of the mixing container in a corner of non-round mixing container. These advantages provide better mixing, especially in smaller mixing containers. In small mixing containers, a dead spot in a middle of the stir bar is reduced or avoided. In addition, the magnetic stir bar adequately mixes the fluid in the mixing container without a surfactant added to the fluid.

Figure 1:
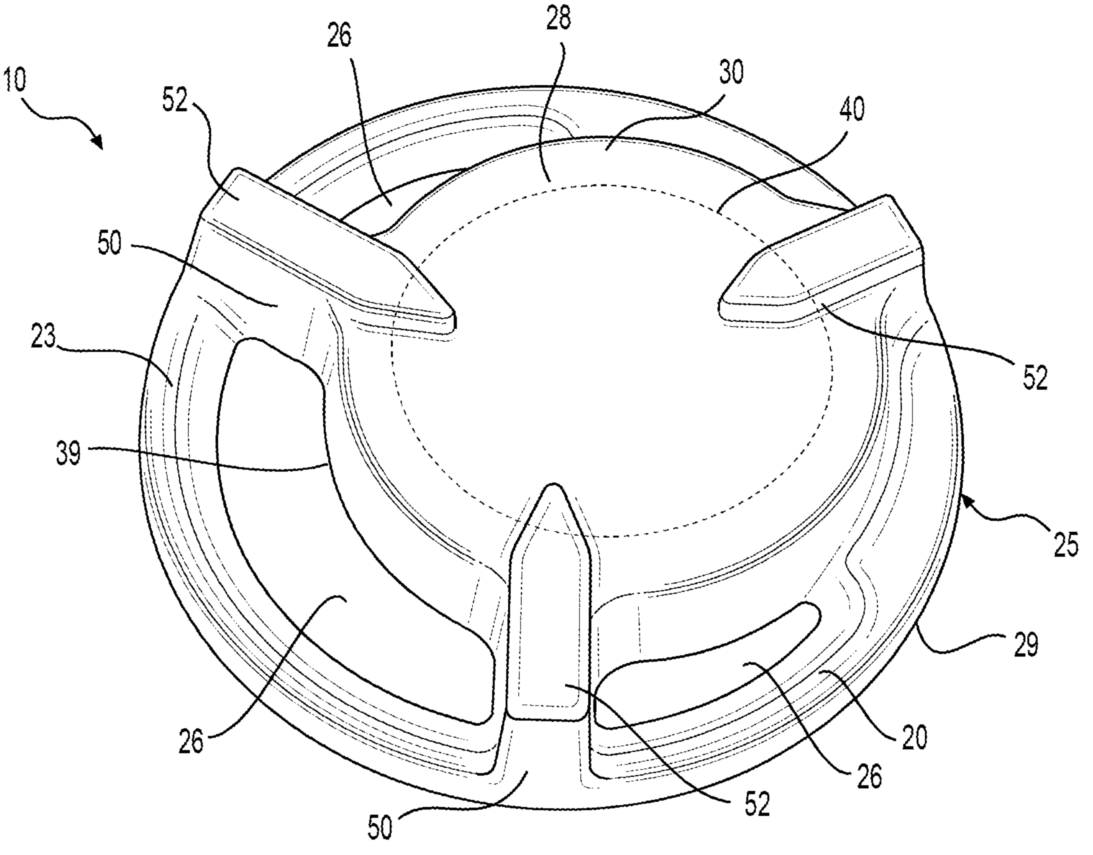
FIG. 1 is a bottom perspective view of a magnetic stir bar with a first portion located at a top side of the magnetic stir bar according to an embodiment of the present disclosure.

FIG. 1 illustrates an asymmetrical magnetic stir bar 10 according to one embodiment. The magnetic stir bar 10 has a first portion 20 at a top side of the magnetic stir bar 10, which defines an outer perimeter 25. A second portion 30 is connected to the first portion 20 by spokes 50 and by intersecting areas of the first portion 20 and second portion 30. The second portion 30 includes at least one magnet 40 embedded therein (shown in dotted line). The first portion 20 in this embodiment is non-magnetic, but may include at least one magnet in other embodiments.

A bottom surface 28 of the second portion 30 protrudes beyond a bottom surface 23 of the first portion 20, and the second portion 30 is thicker than the first portion 20. In this embodiment, a top surface 29 of the first portion 20 is coplanar with a top surface 39 of the second portion 30. The stir bar 10 includes gaps 26 positioned between the spokes 50 where the first portion 20 is spaced apart from the second portion 30. Fins 52 protrude from the spokes 50 and also protrude from the second portion 30. The number of fins 52 or the placement of fins 52 on the magnetic stir bar 10 is not particularly limited. The fins 52 may be included or excluded from the shape of the outer perimeter 25 of the first portion 20 in plan view. Additional features and protrusions may be included on the bottom surface 28 of the second portion 30, the top surface 39 of the second portion 30, the bottom surface 23 of the first portion 20, the top surface 29 of the first portion 20, or the fins 52. In an alternate embodiment, the first portion 20 may be positioned on a bottom of the magnetic stir bar 10, and the bottom surface 23 of the first portion 20 may be coplanar with a bottom surface 28 of the second portion 30.

Figure 2:
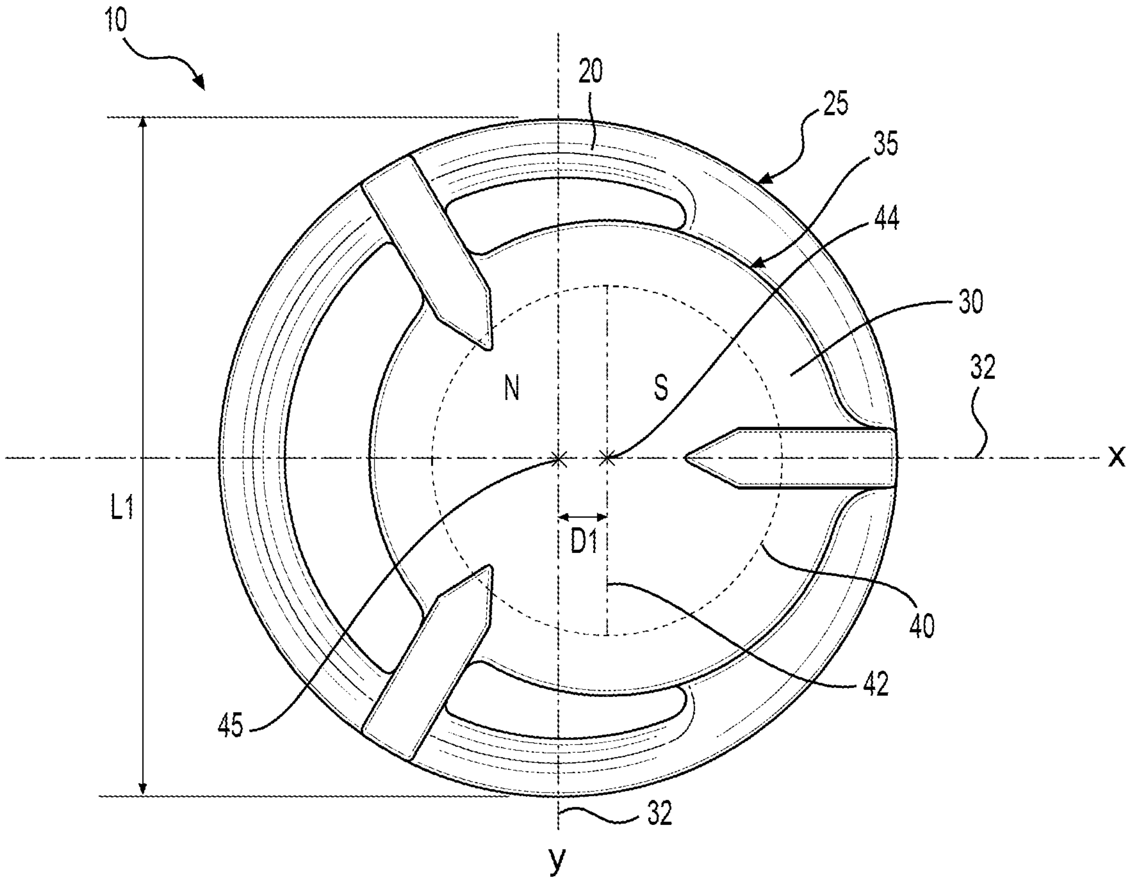
FIG. 2 is a bottom plan view of the magnetic stir bar of FIG. 1.

As shown in FIG. 2, the outer perimeter 25 of the first portion 20 is a circle. In this embodiment, the outer perimeter 25 has at least one axis of symmetry 32. The at least one axis of symmetry 32 has a center 45 between the outer perimeter 25 such that the distance from one side of the outer perimeter 25 to the center 45 along the axis of symmetry 32 is the same as the distance from the opposite side of the outer perimeter 25 to the center 45 along the axis of symmetry 32. The axis of symmetry 32 can also define a length, L1, that is bounded by the outer perimeter 25. The second portion 30 is entirely within the outer perimeter 25 in this plan view.

In this embodiment, the outer perimeter 25 has at least one axis of symmetry 32, and the center 45 of the stir bar 10 can be defined as a point along the axis of symmetry 32, such as the mid-way point along the axis of symmetry 32, or alternatively can be defined with respect to a geometric center of the outer perimeter shape (for a circle, center 45 along the axis of symmetry will coincide with the geometric center). In some embodiments, the outer perimeter may have no axis of symmetry. In embodiments without at least one axis of symmetry, the center 45 may be a geometric center of the outer perimeter 25 of the first portion 20 or a center of mass of the first portion 20.

The magnet 40 has a magnetic center point 44. In this embodiment, the magnetic center point 44 is located on a neutral line 42, bisecting the magnet 40 along a center of the magnet 40, and the magnetic center point 44 is positioned at a halfway point of the neutral line 42. In this embodiment, a north pole (N) and a south pole(S) are divided by the neutral line 42. In this embodiment, the magnetic center point 44 is also a geometric center of the magnet 40. The magnetic center point 44 is positioned off center of the center 45 of the outer perimeter 25 by a distance D1.

Figure 3:
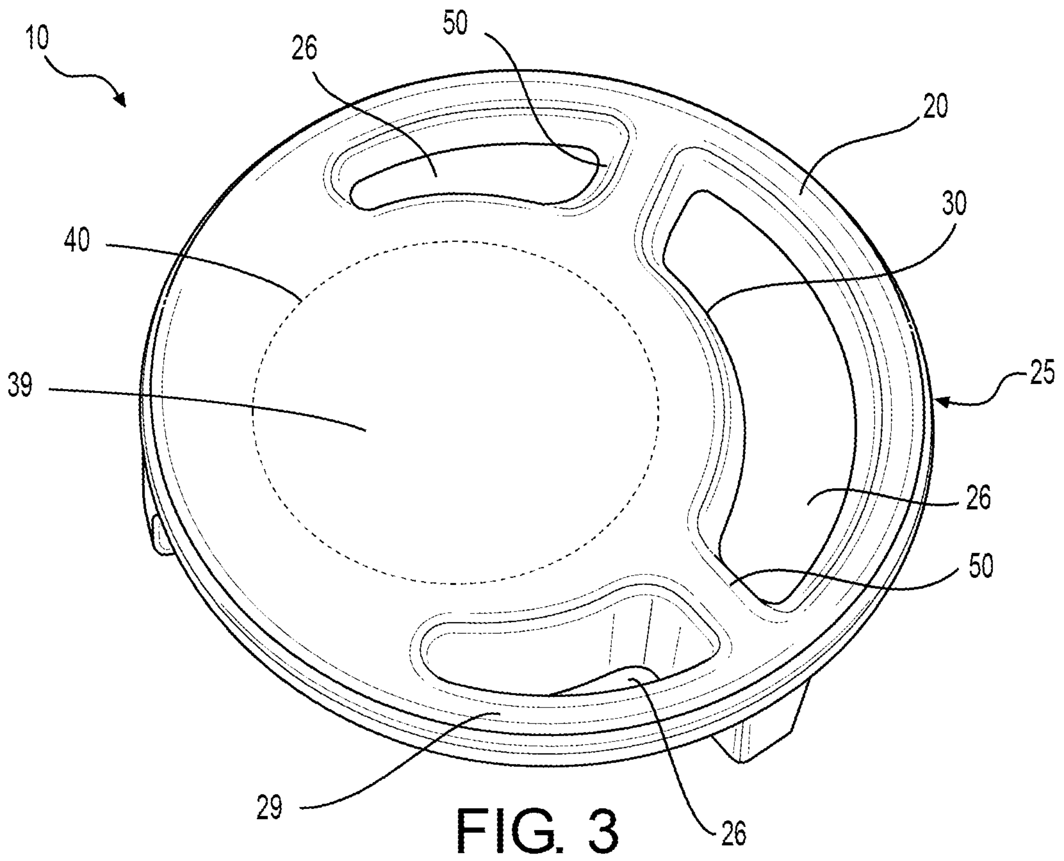
FIG. 3 is a top perspective view of the magnetic stir bar of FIG. 1.

FIG. 3 illustrates a top perspective view of the magnetic stir bar 10 of FIG. 1. The first portion 20 is aligned on the top side of the stir bar 10, and the top surface 29 of the first portion 20 is coplanar with the top surface 39 of the second portion 30. The second portion 30 is separated from the first portion 20 at certain portions by spokes 50, and there are gaps 26 between the spokes 50 where the second portion 30 is separated from the first portion 20. The second portion 30 is positioned such that it is entirely within the outer perimeter 25 of the first portion 20 in plan view. The second portion 30 also includes a disc-shaped magnet 40 embedded therein. Although not illustrated, the magnetic center of magnet 40 would be offset with respect to a center of the axis of symmetry of the outer perimeter 25.

In the illustrated embodiments, the outer perimeter 25 of the first portion 20 has a circular shape. The shape of the outer perimeter is not particularly limited and may be a circle or an ellipse, or a polygon with any number of sides, for example, a triangle, a square, a pentagon, or a hexagon, and the polygon may have straight or curved sides. The shape of the outer perimeter may have at least one axis of symmetry or no axis of symmetry. Likewise, in the illustrated embodiments, the shape of the first portion 20 is a ring or partial ring shape. The shape of the first portion is not particularly limited, and may be a ring, a torus, a tube, an ellipsoid, a cylinder, a sphere, a hemisphere, a cone, a cube, a cuboid, a pyramid, a prism, or a shape with any number of curved or straight sides. A cross section and inside edges of the first portion 20 may be various shapes which assist in mixing and bubble rejection.

In the illustrated embodiments, a perimeter of the second portion has a generally circular shape, and the second portion 30 itself has a disc or cylinder shape. The shape of the second portion 30 and the shape of the perimeter 35 of the second portion 30 are not particularly limited and may separately be a ring, a torus, a tube, an ellipsoid, a cylinder, a sphere, a hemisphere, a cone, a cube, a cuboid, a pyramid, a prism, or a shape with any number of sides.

Regardless of the shapes, either a portion of or an entirety of the second portion is within or aligned with the outer perimeter of the first portion. An outer perimeter of the second portion in plan view may be entirely within the outer perimeter of the first portion in plan view. The outer perimeter of the first portion and the outer perimeter of the second portion may be parallel to each other or coplanar along a longitudinal axis (i.e., orthogonal to axes x, y in FIG. 2).

The magnet in the illustrated embodiments has a disc or cylinder shape. The shape of the magnet is not particularly limited. For example, the magnet may be a cylinder, a bar, a cube, a cuboid, a sphere, a U, a ring, a torus, or a horseshoe.

As illustrated in FIGS. 1-3, the magnet may be housed or encased within the second portion. Alternatively, the second portion may itself constitute a magnet. The magnetic center point of the magnet may fall on a neutral line of the magnet. The neutral line may bisect two poles (N, S) of the magnet and run along a length of the magnet in plan view. The neutral line may be on a magnetic equator of the magnet. The magnetic center point may fall on or approximately on a halfway point of the neutral line, equidistant between two surfaces of the magnet in plan view. As indicated above, the axis of symmetry can define a length L1 between the outer perimeter of the first portion. The magnetic center point of the magnet in the second portion may be off-center with respect to the center point of the outer perimeter of the first portion by a length of D1, that is, e.g., from 1% to 35%, from 3% to 20%, from 5% to 10%, or from 5% to 98% of the length L1, of the at least one axis of symmetry.

In some embodiments, for example in an embodiment with no axis of symmetry, the center point of the outer perimeter of the first portion may be the geometric center of the outer perimeter of the first portion. The length L1 may extend from a first end of the outer perimeter of the first portion to an opposite end of the outer perimeter of the first portion, intersecting both the center point of the outer perimeter of the first portion and the magnetic center point. The distance D1 between the center point of the outer perimeter of the first portion and the magnetic center point may be from 1% to 35%, from 3% to 20%, from 5% to 10%, or from 5% to 98% of the length L1.

The magnetic center point may also or instead be a geometric center of the magnet in plan view or a center of mass of the magnet in plan view. The geometric center or the center of mass of the magnet may be off center with respect to the center point of the outer perimeter of the first portion by at least 1 percent, such as from 1% to 98%, 1% to 35%, from 3% to 20%, or from 5% to 10% of the length L1.

The first portion and the second portion may each have a height measured across the longitudinal axis (i.e., orthogonal to axes x, y in FIG. 2). A height of the second portion may be greater than a height of the first portion. A height of the first portion may be in a range of 5% to 1,000%, 5% to 100%, 7% to 50%, 1% to 30%, or 10% to 30% of the height of the second portion.

The first portion and the second portion may each have a width measured across the outer perimeter of the first portion, for example across the at least one axis of symmetry. A width of the second portion may be in a range of 1% to 99%, 20% to 95%, 40% to 90%, or 50% to 80% of a width of the first portion. The first portion and second portion may each have a length traverse to the width. A length of the second portion may be in a range of 1% to 99%, 20% to 95%, 40% to 90%, or 50% to 80% percent of a length of the first portion.

The magnetic stir bar may be rotated by a magnetic stirrer. The rotation of the magnetic stir bar may be caused by a rotation of a magnet within the stirrer, by a magnetic field generated by electric coils, or other means of generating a moving magnetic field. Upon rotation of the magnetic stir bar, the asymmetry of the magnetic stir bar can cause an unstable rotation leading to uneven, asymmetrical mixing of the fluid in the mixing container. The asymmetry of the magnetic stir bar generates mixing in an asymmetrical flow pattern, causing turbulence within the mixing container and preventing or reducing a volume of unmixed or partially mixed fluid from forming in the mixing container.

During rotation, a rotational axis of the magnetic stir bar may remain constant with a portion of the magnetic stir bar extending asymmetrically in a direction relative to the rotational axis. Alternatively, the rotational axis of the magnetic stir bar may shift during rotation causing unpredictability in flow patterns within the fluid. Accordingly, some embodiments of the magnetic stir bar may include a counterweight or another magnet serving to balance the asymmetry of the magnetic stir bar or a weight of the magnetic stir bar. Alternatively, some embodiments may not include a counterweight or another magnet. A center of mass of the magnetic stir bar may be off center with respect to the center point of the axis of symmetry of the outer perimeter in plan view or off center with respect to a geometric center of the outer perimeter of the first portion. The rotational axis may be at the center point of the outer perimeter of the first portion, offset from the center point of the outer perimeter, at the magnetic center point, or offset from the magnetic center point. The rotational axis may shift between said points. In some embodiments, the magnetic stir bar may rotate around an outer perimeter of a mixing container.

The magnetic stir bar may be used in small mixing containers with a volume in a range of 1 microliter to 10,000 microliters, 5 microliters to 1,000 microliters, 10 microliters to 500 microliters, 1 to 200 microliters, or 30 to 200 microliters.

A volume of the magnetic stir bar may occupy a range of 1% to 99%, 5% to 60%, 8% to 50%, or 10% to 40% of a volume of the mixing container. The width of the first portion of the magnetic stir bar may be in a range of 1% to 99%, 40% to 90%, 50% to 85%, or 60% to 80% of a width of the mixing container. The length of the first portion of the magnetic stir bar may be in a range of 1% to 99%, 40% to 90%, 50% to 85%, or 60% to 80% of a width of the mixing container. The width and/or the length of the first portion relative to the width and/or length of the mixing container may prevent the magnetic stir bar from being stuck or lodged at an edge of the mixing container by keeping the magnet in the magnetic stir bar and a magnet in the stirrer or electrical coils in the stirrer within a distance of each other. The width and/or the length of the first portion relative to the width and/or length of the mixing container may reduce or avoid partially mixed or unmixed regions in the mixing container.

The height of the first portion or the height of the second portion of the magnetic stir bar may be in a range of 1% to 99%, 20% to 70%, 25% to 65%, or 30% to 55% of a height of the mixing container. The height of the magnetic stir bar in relationship to the height of the mixing container may reduce or avoid partially mixed or unmixed regions in the mixing container such as a dead spot in a middle of the mixing container.

The mixing container may be a non-round mixing container. The mixing container is not particularly limited and may be, for example, a cube, cylinder, ellipsoid, hexagon, a cuboid, a prism. The shape of the outer perimeter of the first portion of the magnetic stir bar may prevent the magnetic stir bar from getting stuck or lodged in a corner of the non-round mixing container during rotation of the magnetic stir bar.

The magnetic stir bar may be utilized for chemical titrations, such as acid-base potentiometric titrations to determine alkalinity of an aqueous sample. Stirring a sample with the magnetic stir bar during a chemical titration may improve accuracy of the measurements.

The mixing container may be closed or sealed with at least one electrode affixed to or part of the mixing container for measuring the aqueous sample. A closed mixing container prevents the aqueous sample or other fluids from entering or leaving the mixing container at a time a measurement is taken, so that the container volume is closed to the atmosphere. For example, an inlet valve controlling fluid entering the closed mixing container and an outlet valve controlling fluid exiting the closed mixing container may each be shut when measurements of the closed mixing container are taken.

Figure 4:
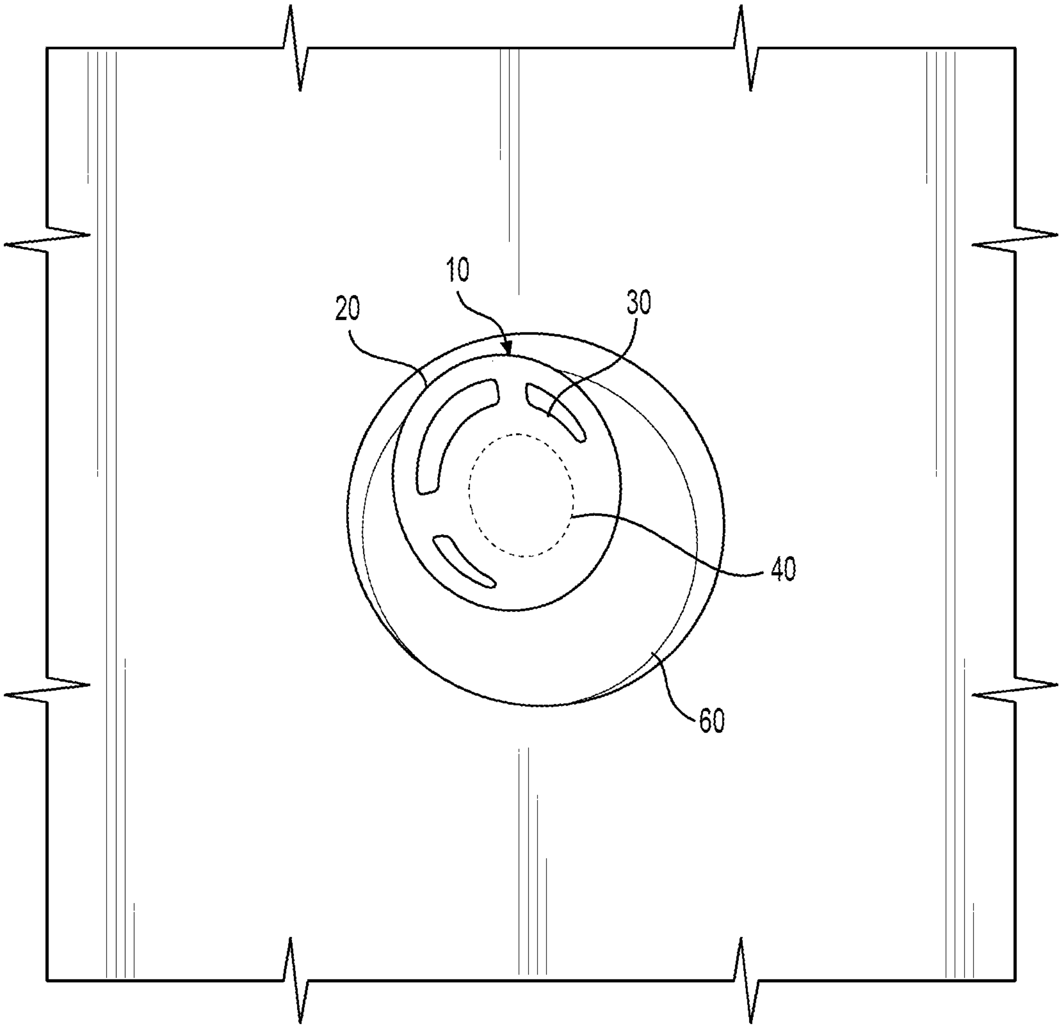
FIG. 4 is a top perspective view of a closed container with the magnetic stir bar.

FIG. 4 illustrates a top perspective view of the magnetic stir bar 10 being used in a closed mixing container 60. A magnet 40 is located within the second portion 30. Electrical coils in a stirrer (not shown), a rotating magnet in a stirrer (not shown), or some other method of generating a changing magnetic field may interact with the magnet 40 in the magnetic stir bar 10 to rotate the magnetic stir bar 10 within the closed mixing container 60. Electrodes (not shown), such as PH sensors may be present within the mixing container 60.

It will be appreciated that the above-disclosed features and functions, or alternatives thereof, may be desirably combined into different systems and methods. Also, various alternatives, modifications, variations or improvements may be subsequently made by those skilled in the art, and are also intended to be encompassed by the disclosed embodiments. As such, various changes may be made without departing from the spirit and scope of this disclosure.

What is claimed is:

1. A magnetic stir bar comprising:

a first portion that defines an outer perimeter that has a shape in plan view with a center point being a geometric center of the shape; and a second portion that is connected to the first portion and includes a magnet, wherein the second portion is arranged so that (i) at least part of the second portion is positioned within the outer perimeter of the first portion; and (ii) a magnetic center point of the magnet in plan view is positioned off-center with respect to the center point of the outer perimeter, wherein the second portion is secured to the first portion such that the first portion and second portion are configured to rotate together;

wherein the magnetic stir bar has only one axis of symmetry when viewed from plan view; and wherein the magnetic center point is positioned on a neutral line that bisects two poles of the magnet along a length of the magnet in plan view.

2. The magnetic stir bar of claim 1, wherein the outer perimeter has at least one axis of symmetry in plan view and the center point falls on the at least one axis of symmetry.

3. The magnetic stir bar of claim 1, wherein the magnetic center point is a geometric center of the magnet in plan view.

4. The magnetic stir bar of claim 1, wherein the outer perimeter is a circle.

5. The magnetic stir bar of claim 1, wherein an entirety of the second portion is within the outer perimeter.

6. The magnetic stir bar of claim 1, wherein the outer perimeter has a length and the magnetic center point is off-center by at least one percent of said length.

7. The magnetic stir bar of claim 1, wherein a height of the second portion along a longitudinal axis is greater than a height of the first portion along the longitudinal axis.

8. The magnetic stir bar of claim 1, wherein the outer perimeter of the first portion and the outer perimeter of the second portion are parallel to each other along a longitudinal axis.

9. A method of mixing a fluid comprising:

providing the fluid in a mixing container with the magnetic stir bar of claim 1; and rotating the magnetic stir bar with a magnetic stirrer.

10. The method of claim 9, wherein the mixing container includes at least one electrode and the mixing container is a closed container, configured to prevent fluid from entering or leaving the container at a time when measurements are taken by the at least one electrode.

11. The method of claim 9, wherein the mixing container is a non-round mixing container.

12. The method of claim 9, further comprising causing uneven mixing of the fluid in the mixing container by an unstable rotation of the magnetic stir bar.

13. The method of claim 9, wherein the mixing container has a volume in a range of 1 microliter to 10,000 microliters.

14. The method of claim 13, wherein the fluid does not include a surfactant.

15. The method of claim 9, wherein a rotational axis of the magnetic stir bar shifts during rotation.

16. The method of claim 9, wherein the magnetic stir bar occupies a range of 1 to 99 percent of a volume of the mixing container.

17. A magnetic stir bar comprising:

a first portion that defines an outer perimeter that has a shape in plan view with a center point being a geometric center of the shape; and a second portion that is connected to the first portion and includes a magnet, wherein the second portion is arranged so that (i) at least part of the second portion is positioned within the outer perimeter of the first portion; and (ii) a magnetic center point of the magnet in plan view is positioned off-center with respect to the center point of the outer perimeter, wherein the second portion is secured to the first portion such that the first portion and second portion are configured to rotate together;

wherein the magnetic stir bar has only one axis of symmetry when viewed from plan view; and wherein a shape of the first portion is a ring.

18. A magnetic stir bar comprising:

a first portion that defines an outer perimeter that has a shape in plan view with a center point being a geometric center of the shape; and a second portion that is connected to the first portion and includes a magnet, wherein the second portion is arranged so that (i) at least part of the second portion is positioned within the outer perimeter of the first portion; and (ii) a magnetic center point of the magnet in plan view is positioned off-center with respect to the center point of the outer perimeter, wherein the second portion is secured to the first portion such that the first portion and second portion are configured to rotate together;

wherein the magnetic stir bar has only one axis of symmetry when viewed from plan view; and wherein a plurality of spokes affix the first portion to the second portion.

* * * * *